April 17, 1934.  H. OLTERSDORF  1,954,945
SPRING STRUCTURE
Filed Sept. 20, 1932

Inventor.
Hermann Oltersdorf
by [signature]
Attorney

Patented Apr. 17, 1934

1,954,945

UNITED STATES PATENT OFFICE 1,954,945

SPRING STRUCTURE

Hermann Oltersdorf, Niesky, Germany

Application September 20, 1932, Serial No. 633,934
In Germany September 23, 1931

2 Claims. (Cl. 267—36)

This invention relates broadly to spring structures such as those commonly employed in vehicles and the like.

A primary object of the invention is to provide an improved spring structure especially adapted for use in motor vehicles and adapted to reduce liability of jars, shocks and the like to a minimum.

A further object of the invention is to provide a spring-device adapted to alter the manner of the distribution of the load as soon as the stress of the spring reaches a certain limit lying below the maximum-load.

The invention resides in the arrangement of the elements of the spring structures in such relation to each other that the above-mentioned novel function is obtained.

The invention will be readily understood by reference to the description of the drawing and to the claims. The drawing however is merely illustrative because the disclosed spring structure is capable of many uses and embodiments without departing from the spirit and principles of the invention.

In the drawing Fig. 1 shows a fragmentary view in side elevation of a structure made in accordance with the invention;

Figure 1:
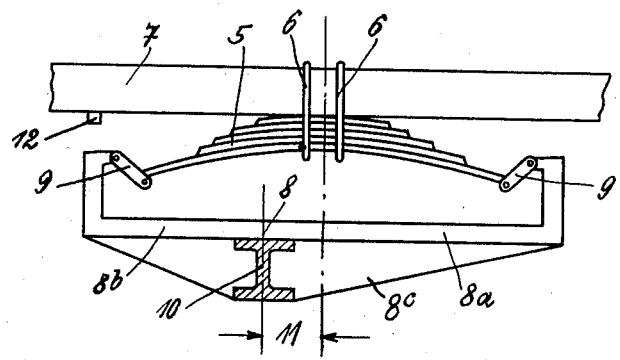
Figure 2:
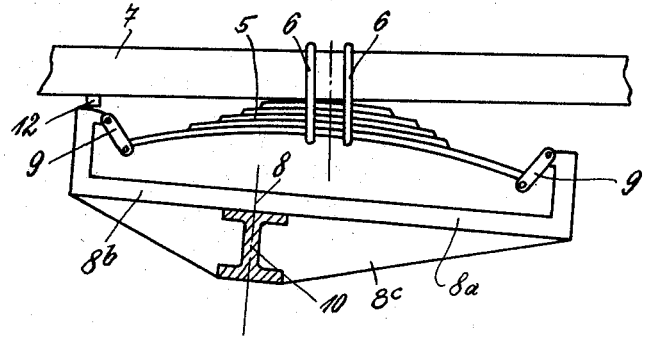
Fig. 2 is a view similar to Fig. 1 and shows the position of the spring structure after having reached the limit of the lower scope of load.
Figure 3:
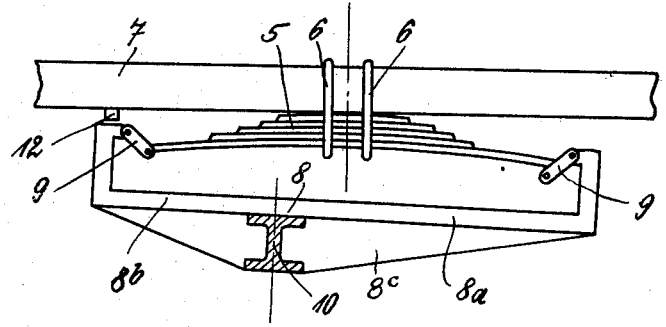
Fig. 3 is a view similar to Figs. 1 and 2 and shows the spring structure loaded nearly to the upper limit of stress.

As shown in Figs. 1–3 a semi-elliptical spring 5 comprising a plurality of leaf-elements is mounted in a suitable manner e. g. by means of two bridles 6 upon the chassis 7. Both ends of the spring 5 are connected to the respective ends of a bearing member 8 by means of shackles 9. The bearing member may be a rigid cross bearer and have a downwardly extending reinforcing rib 8c (Figs. 1 to 3). In each case the bearing member is rigidly mounted, for example by welding on bolts upon the axle 10 at the ends of which the wheels (not shown) are mounted in any suitable manner. The point at which the axle 10 is attached to the bearing member 8 is displaced with regard to the point of the attachment of the spring 5 at the chassis 7. This displacement is indicated at 11. Therefore both points are arranged one below the other but not in vertical alinement in order to distribute the load unsymmetrically among the ends of the spring. In fact, the bearing member 8 has a longer arm 8a and a shorter arm 8b. 12 is a rest mounted upon the chassis 7 and adapted to limit the movement of the shorter arm 8b of the bearing member.

Figure 4:
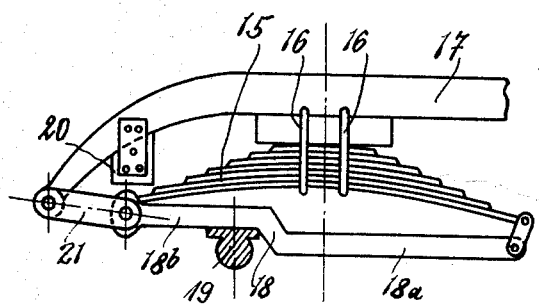
Fig. 4 is a fragmentary view in side elevation similar to Fig. 1 of a modified form of spring-structure.

In the form of construction illustrated in Fig. 4 a semi-elliptical spring 15 is fixed to the chassis 17 by means of the two shackles 16. The bearing member 18 is fixed upon the wheel axle 19 in a suitable manner so that the fixing points of the springs 15 on the chassis 17 are laterally placed relative to the fixing points of the bearing member 18 on the axle 19. On the front end of the chassis 17 a rest 20 is arranged so that it bears over the front end of the bearing member 18 which is hingedly connected to the outermost end of the chassis 17 by means of a shackle 21. The left end of the spring 15 directly engages the short arm 18b of the bearing member 18. The right end of the spring 17 is hingedly connected to the longer arm 18a of the bearing body by the usual shackle.

The function of each mode of application of the new spring structure may be described as follows:

Normally the elements have the position shown in Fig. 1 or Fig. 4. Now, if the vehicle is loaded or if the wheels attached to the axle 10 pass over a small elevation of the ground the spring structure is brought into a position similar to that shown in Fig. 2. The displacement of the spring-structure may be such that the shorter arm 8b of the bearing member 8 comes into touch with the rest 12. This takes place as soon as the load or stress reaches the limit of the lower scope of stress of the spring structure. It depends on the size of the eccentricity 11. With a load exceeding the said limit the shorter arm 8b remains in contact with the rest 12 and the further movement takes place with the point of contact between the end of arm 8b and the rest 12, as a point of rotation.

During the first part of its movement i. e. between the position according to Fig. 1 and the position according to Fig. 2 the spring 5 is stressed in a manner quite different from that which takes place during the last part of the said movement i. e. during the position according to Fig. 3. Therefore the spring structure according to the invention has two scopes of charge. This advantage may also be obtained with a spring which is eccentrically attached to the chassis.

What I claim is:

1. In combination with a vehicle frame and a vehicle axle a spring structure comprising a leaf-spring mounted upon the said frame, a bearing member mounted upon the axle at a point spaced from the midportion of said bearing member and forming a long and a short arm, means for connecting the ends of the spring to the ends of said bearing member, and a rest mounted upon said frame in such relation to the short arm of said bearing member that this arm comes into contact with said rest when the spring deflection reaches a certain limit.

2. In a combination according to claim 1 a yielding connection between the end of the short arm of said bearing member and the vehicle frame.

HERMANN OLTERSDORF.